(12) United States Patent
Welton et al.

(10) Patent No.: US 7,204,311 B2
(45) Date of Patent: *Apr. 17, 2007

(54) METHODS FOR CONTROLLING MIGRATION OF PARTICULATES IN A SUBTERRANEAN FORMATION

(75) Inventors: Thomas D. Welton, Duncan, OK (US); Philip D. Nguyen, Duncan, OK (US); Matthew E. Blauch, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 239 days.

This patent is subject to a terminal disclaimer.

(21) Appl. No.: 11/009,277

(22) Filed: Dec. 8, 2004

(65) Prior Publication Data

US 2005/0092489 A1 May 5, 2005

Related U.S. Application Data

(63) Continuation-in-part of application No. 10/864,618, filed on Jun. 9, 2004, now Pat. No. 7,131,491, and a continuation-in-part of application No. 10/864,061, filed on Jun. 9, 2004, and a continuation-in-part of application No. 10/649,029, filed on Aug. 27, 2003, now Pat. No. 7,040,403.

(51) Int. Cl.
*E21B 33/138* (2006.01)
*E21B 43/26* (2006.01)

(52) U.S. Cl. .................. 166/295; 166/300; 166/308.2; 166/308.6; 507/202; 507/224; 507/226; 507/267; 523/131

(58) Field of Classification Search ................ 166/294, 166/295, 300, 308.2, 308.6; 507/202, 224, 507/226, 267; 523/131
See application file for complete search history.

(56) References Cited

U.S. PATENT DOCUMENTS

| | | | |
|---|---|---|---|
| 4,670,501 A | 6/1987 | Dymond et al. ............. 524/458 |
| 4,681,165 A | 7/1987 | Bannister .................... 166/312 |
| 4,772,646 A | 9/1988 | Harms et al. .................. 524/27 |
| 4,777,200 A | 10/1988 | Dymond et al. ............. 524/458 |
| 5,095,987 A | 3/1992 | Weaver et al. .............. 166/276 |
| 5,249,627 A | 10/1993 | Harms et al. ............... 166/308 |
| 5,278,203 A | 1/1994 | Harms ......................... 523/200 |
| 5,381,864 A | 1/1995 | Nguyen et al. ............. 166/280 |
| 5,492,178 A | 2/1996 | Nguyen et al. ............. 166/276 |
| 5,501,274 A | 3/1996 | Nguyen et al. ............. 166/276 |
| 5,582,249 A | 12/1996 | Caveny et al. ............. 166/276 |
| 5,697,440 A | 12/1997 | Weaver et al. .............. 166/281 |
| 5,775,425 A | 7/1998 | Weaver et al. .............. 166/276 |
| 5,787,986 A | 8/1998 | Weaver et al. .............. 166/280 |
| 5,833,000 A | 11/1998 | Weaver et al. .............. 166/276 |
| 5,839,510 A | 11/1998 | Weaver et al. .............. 166/276 |
| 5,853,048 A | 12/1998 | Weaver et al. .............. 166/279 |
| 5,871,049 A | 2/1999 | Weaver et al. .............. 166/276 |
| 5,921,317 A | 7/1999 | Dewprashad et al. ........ 166/208 |
| 5,924,488 A | 7/1999 | Nguyen et al. ............. 166/280 |
| 5,960,878 A | 10/1999 | Nguyen et al. ............. 166/276 |
| 6,016,870 A | 1/2000 | Dewprashad et al. ........ 166/295 |
| 6,047,772 A | 4/2000 | Weaver et al. .............. 166/276 |
| 6,059,034 A | 5/2000 | Rickards et al. ............ 166/280 |
| 6,209,643 B1 | 4/2001 | Nguyen et al. ............. 166/276 |
| 6,311,773 B1 | 11/2001 | Todd et al. .................. 166/280 |
| 6,330,916 B1 | 12/2001 | Rickards et al. ............ 166/280 |
| 6,439,309 B1 | 8/2002 | Matherly et al. ........... 166/276 |
| 6,450,260 B1 | 9/2002 | James et al. ................. 166/277 |
| 6,534,449 B1 | 3/2003 | Gilmour et al. ............. 507/203 |
| 6,978,836 B2 * | 12/2005 | Nguyen et al. ............. 166/295 |
| 2003/0054962 A1 | 3/2003 | England et al. |
| 2003/0230408 A1 | 12/2003 | Acock et al. ................ 166/297 |
| 2004/0014608 A1 | 1/2004 | Nguyen et al. ............. 507/200 |
| 2005/0061509 A1 * | 3/2005 | Nguyen ....................... 166/307 |

FOREIGN PATENT DOCUMENTS

| | | |
|---|---|---|
| EP | 1132569 A2 | 12/2001 |
| WO | 0 879 935 A2 | 11/1998 |
| WO | WO 2005/021930 | 3/2005 |

OTHER PUBLICATIONS

Foreign Search Report and Opinion (PCT Appl. No. GB2004/002943), Nov. 19, 2004.

Attia, Yosry, et al, *Adsorption Thermodynamics of a Hydrophobic Polymeric Flocculant of Hydrophobic Colloidal Coal Particles*, 1991, American Chemical Society, Langmuir, 7, pp. 2203-2207.

Foreign Search Report and Opinion (PCT Appl. No. GB2005/004044).

* cited by examiner

*Primary Examiner*—George Suchfield
(74) *Attorney, Agent, or Firm*—Robert A. Kent; Baker Botts

(57) ABSTRACT

Method of treating a portion of a subterranean formation comprising: placing a pre-pad fluid into a portion of a subterranean formation wherein the pre-pad fluid comprises a low-viscosity aqueous tackifying composition that comprises an aqueous tackifier compound and an aqueous fluid; placing a fracturing fluid into the portion of the subterranean formation at a pressure sufficient to create or extend at least one fracture therein; and, activating the aqueous tackifier compound with an activator so as to consolidate the unconsolidated particulates. Method of consolidating unconsolidated particulates within a portion of a subterranean formation comprising: placing a foamed low-viscosity aqueous tackifying composition into a portion of a subterranean formation comprising unconsolidated particulates wherein the aqueous tackifying composition comprises an aqueous fluid, a foaming agent, and an aqueous tackifier compound; and, activating the aqueous tackifier compound with an activator so as to consolidate the unconsolidated particulates.

44 Claims, No Drawings

METHODS FOR CONTROLLING MIGRATION OF PARTICULATES IN A SUBTERRANEAN FORMATION

CROSS REFERENCE TO RELATED APPLICATIONS

This application is a continuation-in-part of U.S. application Ser. No. 10/649,029, filed on Aug. 27, 2003 now U.S. Pat. No. 7,040,403 and of U.S. application Ser. No. 10/864,618, filed on Jun. 9, 2004 now U.S. Pat. No. 7,131,491 and of U.S. application Ser. No. 10/864,061, filed on Jun. 9, 2004

BACKGROUND

The present invention relates to methods for controlling the migration of particulates, such as proppant and formation sands, within a portion of a subterranean formation through the use of a low-viscosity aqueous tackifying composition.

Hydrocarbon wells are often located in subterranean zones that contain unconsolidated particulates that may migrate within the subterranean formation with the oil, gas, water, and/or other fluids produced by the wells. The presence of particulates, such as formation sand, in produced fluids is disadvantageous and undesirable in that the particulates may abrade pumping and other producing equipment and reduce the fluid production capabilities of the producing zones. Unconsolidated subterranean zones include those that contain loose particulates and those wherein the bonded particulates have insufficient bond strength to withstand the forces produced by the production of fluids through the zones.

One method of controlling particulates in unconsolidated formations involves placing a filtration bed containing gravel near the well bore in order to present a physical barrier to the transport of unconsolidated formation fines with the production of hydrocarbons. Typically, such so-called "gravel packing operations" involve the pumping and placement of a quantity of a desired particulate into the unconsolidated formation in an area adjacent to a well bore. One common type of gravel packing operation involves placing a sand control screen in the well bore and packing the annulus between the screen and the well bore with gravel of a specific size designed to prevent the passage of formation sand. The sand control screen is generally a filter assembly used to retain the gravel placed during gravel pack operation. A wide range of sizes and screen configurations are available to suit the characteristics of the gravel pack sand used. Similarly, a wide range of sizes of gravel is available to suit the characteristics of the unconsolidated or poorly consolidated particulates in the subterranean formation. The resulting structure presents a barrier to migrating sand from the formation while still permitting fluid flow. When installing the gravel pack, the gravel is carried to the annulus in the form of a slurry by mixing the gravel with a viscous transport fluid. Once the gravel is placed in the well bore, the viscosity of the transport fluid is reduced, and it is returned to the surface. Some gravel packing operations, commonly known as "high-rate water packing" operations, the transport fluid viscosity is somewhat lowered and yet the gravel remains in suspension because the treatment occurs at a substantially higher velocity. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing. Such packs may be time consuming and expensive to install.

Another method used to control particulates in unconsolidated formations involves consolidating unconsolidated subterranean producing zones into hard, permeable masses by applying a resin composition to the unconsolidated particulates. Another, similar method involves placing a non-aqueous tackifying composition to the unconsolidated particulates in an effort to reduce the migration of particulates within the zone. Whereas a resin composition produces a hard mass, the use of a non-aqueous tackifying composition produces a more malleable consolidated zone.

SUMMARY OF THE INVENTION

The present invention relates to methods for controlling the migration of particulates, such as proppant and formation sands, within a portion of a subterranean formation through the use of a low-viscosity aqueous tackifying composition.

A method of treating a portion of a subterranean formation in preparation for a fracturing operation comprising: placing a pre-pad fluid into a portion of a subterranean formation comprising unconsolidated particulates wherein the pre-pad fluid comprises a low-viscosity aqueous tackifying composition that itself comprises an aqueous tackifier compound and an aqueous fluid; placing a fracturing fluid into the portion of the subterranean formation at a pressure sufficient to create or extend at least one fracture therein; and, activating the aqueous tackifier compound with an activator so as to consolidate the unconsolidated particulates within the portion of the subterranean formation.

A method of consolidating unconsolidated particulates within a portion of a subterranean formation comprising: placing a foamed low-viscosity aqueous tackifying composition into a portion of a subterranean formation comprising unconsolidated particulates wherein the aqueous tackifying composition comprises an aqueous fluid, a foaming agent, and an aqueous tackifier compound; and, activating the aqueous tackifier compound with an activator so as to consolidate the unconsolidated particulates within the portion of the subterranean formation.

Other and further objects, features and advantages of the present invention will be readily apparent to those skilled in the art upon a reading of the description of preferred embodiments which follows.

DESCRIPTION OF PREFERRED EMBODIMENTS

The present invention relates to methods for controlling the migration of particulates, such as proppant and formation sands, within a portion of a subterranean formation through the use of a low-viscosity aqueous tackifying composition.

In accordance with the present invention, a low-viscosity aqueous tackifying composition may be used to control the migration of particulates within a portion of a subterranean formation. The particulates to be controlled may have been placed into the subterranean formation (as in the case of proppant and gravel) or may be naturally occurring within the formation (such as formation fines and sands).

Some embodiments of the present invention provide methods of treating portions of subterranean formations comprising: placing a foamed aqueous tackifying composition comprising an aqueous tackifier compound and a foaming agent into the portion of the subterranean formation; and, activating the aqueous tackifier compound to make it tacky.

In some such embodiments, the placement of the foamed aqueous tackifying composition may be preceded by the placement of a preflush fluid that, among other things, prepares the portion of the subterranean formation to receive the aqueous tackifying composition. Also, in some such embodiments, the activation of the aqueous tackifier compound may be followed by the placement of an afterflush fluid that, among other things, may flush residue aqueous tackifier compound from the interstitial spaces and pore spaces within the subterranean formation. As will be described in more detail below, the aqueous tackifier compound may be activated through the use of a separate activating step, or may be activated by coming into contact with activators already present in the subterranean formation.

Other embodiments of the present invention provide methods of treating portions of subterranean formations comprising: placing a fracturing pre-pad fluid comprising an aqueous tackifying composition that itself comprises an aqueous tackifier compound into the portion of the subterranean formation; placing a fracturing fluid into the portion of the subterranean formation at the pressure sufficient to create or extends at least one fracture therein; and, activating the aqueous tackifier compound. In some such embodiments, the pre-pad fluid may be a foamed fluid. Also, in some such embodiments, the placement of the pre-pad fluid may be preceded by the placement of a preflush fluid that, among other things, prepares the portion of the subterranean formation to receive the aqueous tackifier compound. Also, in some such embodiments, the activation of the aqueous tackifier compound may be followed by the placement of an afterflush fluid that, among other things, may flush residue aqueous tackifier compound from the interstitial spaces and pore spaces within the subterranean formation. As will be described in more detail below, the aqueous tackifier compound may be activated through the use of a separate activating step, or may be activated by the presence of activators in the chosen fracturing fluid, or may be activated by coming into contact with activators already present in the subterranean formation.

Aqueous tackifying compositions suitable for use in the present invention generally comprise an aqueous liquid and one or more aqueous tackifier compounds. The aqueous liquid used may be fresh water, salt water (e.g., water containing one or more salts dissolved therein), brine, seawater, or any other aqueous liquid that does not adversely react with the other components used in accordance with this invention or with the subterranean formation. Suitable aqueous tackifier compounds are substances that are capable of being activated to become tacky. As used in the present invention, the term "tacky," in all of its forms, generally refers to a substance having a nature such that it is (or may be activated to become) somewhat sticky to the touch. As used herein the term "unconsolidated" refers to a situation in which particulates (such as proppant, formation sands, or fines) are loosely bound together, unbound, or so weakly bound as to be able to migrate with fluids moving throughout a portion of a subterranean formation. Suitable aqueous tackifier compounds are capable of forming at least a partial coating upon such unconsolidated particulates. Suitable aqueous tackifier compounds may not be significantly tacky when placed onto a particulate, but are capable of being "activated" (that is destabilized, coalesced and/or reacted) to transform into a tacky compound at a desirable time. Such activation may occur before, during, or after the aqueous tackifier compound is placed in the subterranean formation.

Suitable aqueous tackifier compounds are generally charged polymers that, when in an aqueous solvent or solution, will form a non-hardening coating (by itself or with an activator) and, when placed on a particulate, will increase the continuous critical resuspension velocity of the particulate when contacted by a stream of water (further described in Example 1, below). The aqueous tackifier compound enhances the grain-to-grain contact between the individual particulates within the formation (be they proppant particulates, formation fines, or other particulates), helping bring about the consolidation of the particulates into a cohesive, flexible mass.

Examples of aqueous tackifier compounds suitable for use in the present invention include, but are not limited to, charged polymers such as acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacryate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof.

While many potential methods exist for determining whether a material may be a suitable aqueous tackifier, one practical method of choosing a suitable polymer is as follows: place the polymer being tested in concentrated form (that is, about 20–50% concentration) and add an activator (as described below) to the polymer. If the mixture, empirically, appears to coagulate to form a solid or semisolid mass the polymer represents a suitable aqueous tackifier according to the present invention. If the mixture does not appear to coagulate to form a solid or semisolid mass, then another activator should be chosen and the test repeated. One skilled in the art, knowing the desired result of coagulation, will be able to select likely activators. For example, when testing an acrylate-based polymer for suitability as an aqueous tackifier, a mixture comprising 50% Acetic Anhydride and 50% Glacial Acetic acid (v/v) is a likely activator. The choice of aqueous tackifier compounds may depend, inter alia, on the down hole conditions (e.g., salinity, temperature, and/or pH). The relationship between these and other down hole conditions will not be uniform across all suitable aqueous tackifier compounds. For instance, high salinity might accelerate activation for some aqueous tackifier compounds while delaying activation for others. One skilled in the art will be able to determine the effect of the particular down hole conditions on the chosen aqueous tackifier compound. For example, when using a polyacrylate polymer, high salinity and/or extremes of pH (either above about 9 or below about 5) generally accelerate activation.

In some embodiments the aqueous tackifying compositions may further comprise one or more surfactants in addition to the aqueous liquid and aqueous tackifier compound. Such a surfactant is generally chosen based on the relative charges of the portion of the subterranean formation being treated and the charge of the chosen aqueous tackifier compound. This is due to the fact that, as suitable aqueous tackifier compounds are generally charged polymers, they preferentially attach to surfaces having an opposite charge. For instance, an aqueous tackifier compound having a negative charge will preferentially attach to surfaces having a positive to neutral zeta potential and/or a hydrophobic surface. Similarly, using analogous chemistry, positively charged aqueous tackifier compounds will preferentially attach to negative to neutral zeta potential and/or a hydrophilic surfaces. In particular embodiments where the surface (formation or particulate) being treated lacks an adequately receptive surface (that is, the surface being treated lacks a charge substantially opposite of the chosen aqueous tackifier compound), a surfactant may be used to aid in attracting the aqueous tackifier compound to the surface. For example, one could use a cationic surfactant to treat a surface with a negative zeta potential or treat a surface with a positive zeta potential by using anionic surfactant. As will be understood by one skilled in the art, amphoteric and zwitterionic surfactants may also be used so long as the conditions they are exposed to during use are such that they display the desired charge. As will be understood by one of skill in the art, with the benefit of this disclosure, the use of a surfactant is optional and depends, at least in part, on the charge disparity or lack thereof between the chosen aqueous tackifier compound and the surface being treated.

In some embodiments of the present invention it may be desirable for the aqueous tackifying composition to be a "low-viscosity aqueous tackifying composition," that is, have a low enough viscosity to be able to penetrate into the interstitial and pore spaces within the portion of the subterranean formation to be treated. Generally, before activation, a suitable aqueous tackifying composition exhibits a relatively low viscosity, making aqueous tackifying compositions well-suited to this purpose. Some methods of the present invention call for the viscosity of the low-viscosity aqueous tackifying composition to be less than about 100 cP. In other embodiments the viscosity of the low-viscosity aqueous tackifying composition may be less than about 50 cP. In still other embodiments the viscosity of the low-viscosity aqueous tackifying composition may be less than about 10 cP. In embodiments wherein it is desirable to lower the viscosity of a chosen aqueous tackifying composition, the aqueous tackifier compound may be combined with a solvent, may be heated, or may be foamed to achieve such a reduction. Of course, as will be understood by one skilled in th art with the benefit of this disclosure, the aqueous tackifying composition may be foamed for reasons beyond just viscosity reduction.

In embodiments using a solvent, it is within the ability of one skilled in the art, with the benefit of this disclosure, to determine how much solvent is needed to achieve a viscosity suitable to the subterranean conditions. Any solvent that is compatible with the aqueous tackifier compound and achieves the desired viscosity effects is suitable for use in the present invention. The solvents that can be used in the present invention preferably include those having high flash points (most preferably above about 125° F.). Examples of some solvents suitable for use in the present invention include, but are not limited to, water, butylglycidyl ether, dipropylene glycol methyl ether, butyl bottom alcohol, dipropylene glycol dimethyl ether, diethyleneglycol methyl ether, ethyleneglycol butyl ether, diethyleneglycol butyl ether, propylene carbonate, butyl lactate, dimethyl sulfoxide, dimethyl formamide, fatty acid methyl esters, and combinations thereof.

In some embodiments the aqueous tackifying composition is a foamed fluid. Foamed fluids are those in which a relatively large volume of gas is dispersed in a relatively small volume of liquid, usually with the aid of a surfactant to reduce the surface tension of the fluids. The most commonly used foaming agents are nitrogen, carbon dioxide, and combinations of the two. Such gaseous foaming agents generally are non-combustible, readily available, and relatively inexpensive. Carbon dioxide foams may be preferred based on the fact that their use results in little or no loss of hydrostatic pressure since, among other things, carbon dioxide foam has a density close to water and thus does not bleed off to the extent a lower density foam, such as a nitrogen foam, might. As used herein the term "foamed fluid" refers both to fluids that are directly foamed with foaming agents and those that are commingled with a foam. A surfactant is often used to help stabilize such foams. Any surfactant compatible with the aqueous tackifier compound and capable of helping to maintain the foam may be used in the present invention. Such surfactants include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773 issued to Todd et al. on Nov. 6, 2001, the disclosure of which is incorporated herein by reference. A $C_{12}$–$C_{22}$ alkyl phosphonate surfactant may be preferred. The surfactant or surfactants used are included in the foamed fluid in an amount sufficient to aid in maintaining the foam. In some embodiments of the present invention, the foamed fluid comprises surfactant in an amount ranging from about 0.1% to about 15% by weight of the aqueous liquid. In some embodiments the surfactant chosen to stabilize the foam may also act to activate the aqueous tackifier compound.

As mentioned above, initially non-tacky aqueous tackifier compounds may be activated to become tacky. Typically, a suitable activator is an organic acid (or an anhydride of an organic acid that is capable of hydrolyzing in water to create an organic acid), an inorganic acid, an inorganic salt (such as a brine), a charged surfactant, a charged polymer, or a combination thereof. However, any substance that is capable of making the aqueous tackifier compound insoluble in an aqueous solution may be used as an activator in accordance with the teachings of the present invention. Thus, such activation is analogous to coagulation; for example, many nature rubber latexes are coagulated with acetic or formic acid during the manufacturing process. An example of one activator suitable for use in the present invention is an acetic acid/acetic anhydride blend. Other acids, acids salts, anhydrides, and mixtures thereof may be also suitable. Examples of some salts suitable for use as activators include but are not limited to, sodium chloride, potassium chloride, calcium chloride, and mixtures thereof. In some embodiments of the present invention, the concentration of salts or other activating compounds present in the formation itself may be sufficient to activate the aqueous tackifier compound. In such embodiments it may not be necessary to add an external activator. Generally, when used, the activator is present in an amount in the range of from about 0.1% to about 40% by weight of the aqueous tackifying composition; however, in some cases such as with brines the activator may be in excess of the treatment fluids and aqueous tackifier compound.

In some embodiments of the present invention it may be desirable to place a preflush fluid into the portion subterranean formation being treated before placing the aqueous tackifier compound. The preflush fluid acts to clear debris from the portion of the formation being treated and to prepare the formation sands to accept the aqueous tackifier. As described above, suitable aqueous tackifier compounds are generally charged polymers and they preferentially attach to surfaces having an opposite charge. Thus, it may be desirable to preflush the portion subterranean formation being treated with a preflush fluid comprising an aqueous fluid and a charged compound wherein the charged compound has a charge substantially opposite of the chosen aqueous tackifier compound. In particular embodiments wherein the surface being treated lacks an adequately receptive surface (that is, the surface being treated lacks a charge substantially opposite of the chosen aqueous tackifier compound), a preflush fluid may act to make the surface more receptive to the aqueous tackifier compound. For example, one could use a preflush fluid such as a cationic polymer to treat a surface with a negative zeta potential or treat a surface with a positive zeta potential by using anionic preflush fluids. As will be understood by one skilled in the art, amphoteric and zwitterionic preflush fluids may also be used so long as the conditions they are exposed to during use are such that they display the desired charge.

Generally, suitable preflush fluids comprise an aqueous fluid and a charged compound. Suitable charged compounds are generally the same as those described above as suitable activators. The aqueous liquid used may be fresh water, salt water (e.g., water containing one or more salts dissolved therein), brine, seawater, or any other aqueous liquid that does not adversely react with the other components used in accordance with this invention or with the subterranean formation. As will be understood by one of skill in the art, with the benefit of this disclosure, the use of a preflush fluid is optional and depends, at least in part, on the charge disparity or lack thereof between the chosen aqueous tackifier compound and the surface being treated. Preflush fluids, however, generally do not contain enough of the charged compound to make the aqueous tackifier compound tacky. For example, where the same chemical is used as a charged compound in a preflush fluid preflush fluid and then as an activator, the preflush fluid may make up only from about 0.1% to about 5% of the volume of the total amount of the chemical used. One skilled in the art will recognize that the preflush fluid is primarily used to prepare a surface to accept an aqueous tackifier compound and, generally, will not be used in an amount sufficient to substantially activate the aqueous tackifier compound. In some embodiments of the present invention, the preflush fluid comprises a charged compound in an amount ranging from about 0.1% to about 15% by weight of the aqueous liquid.

In some embodiments of the present invention it may be desirable to place an afterflush fluid into the portion subterranean formation being treated after the aqueous tackifier compound has been activated. The use of an afterflush treatment to restore the treated formation's permeability is optional. In some embodiments, it may be desirable to place the low-viscosity aqueous tackifier compound and then leave it in place and stimulate the formation (through fracturing, perforating, or some similar process). In other embodiments, an afterflush fluid may be used, among other things, to remove the solvent used to the control the viscosity of the aqueous tackifier compound and/or to help restore the formation permeability.

Suitable afterflush fluids comprise an aqueous liquid and, optionally, a surfactant. The aqueous liquid used may be fresh water, salt water (e.g., water containing one or more salts dissolved therein), brine, seawater, or any other aqueous liquid that does not adversely react with the other components used in accordance with this invention or with the subterranean formation. In some embodiments of the present invention, it may be desirable to add a surfactant to the afterflush fluid. The surfactant may act, among other things, to prepare the formation particulates to accept and adhere the tackifying material. Any surfactant compatible with the low-viscosity aqueous tackifier compound and capable of aiding the after-flush fluid to flow to the contact points between adjacent particulates in the formation may be used in the present invention. Such surfactants include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773 issued to Todd et al. on Nov. 6, 2001, the disclosure of which is incorporated herein by reference. A $C_{12}$–$C_{22}$ alkyl phosphonate surfactant may be preferred. In some embodiments of the present invention, the afterflush fluid comprises surfactant in an amount ranging from about 0.1% to about 15% by weight of the aqueous liquid.

Following the placement of the afterflush fluid, what remains is a relatively concentrated film or layer of aqueous tackifier compound on the particulates that have been treated. That layer of aqueous tackifier compound acts, among other things, to prolong the production rates of the well at rates as high as possible by controlling the movement of subterranean particulates and keeping them from plugging productive pore spaces and channels. The ability of the aqueous tackifier compound to form a thin layer on the formation particulates allows the methods of the present invention to be useful even in situations where the pore spaces are relatively small, such as following an acidizing treatment, or before or after hydraulic fracturing, frac packing, water fracturing, and gravel packing.

As mentioned above, aqueous tackifier compounds suitable for use in the present invention must be activated to take on a tacky character. In some cases, fluids already present in the subterranean formation may comprise amply activating compounds and so no additional activator will need to be used. In other embodiments, it may be desirable to place an activator in the subterranean formation once the aqueous tackifier has been placed. In some embodiments wherein the aqueous tackifier compound is used a part of a pre-pad treatment before a fracturing operation, once the aqueous tackifier compound is placed, an after-flush comprising an activator may be placed in the formation before fracturing. In other embodiments wherein the aqueous tackifier compound is used as part of a pre-pad treatment before a fracturing operation the activator may be added to the fracturing fluid itself so that the aqueous tackifier compound is activated while the formation is being fractured. Where the aqueous tackifier compound is used not as a pre-pad for fracturing, but as an independent consolidation fluid, and wherein the fluids already present in the subterranean formation either don't comprise ample activating compounds or wherein additional activator is desired, the activator may be included in the after-flush fluid.

To facilitate a better understanding of the present invention, the following examples of some of the preferred embodiments are given. In no way should such examples be read to limit the scope of the invention.

EXAMPLE 1

A sample of 20/40 Brady Sand was treated (41.25% polyacrylate ester polymer concentrate, 3.75% surfactants, 30% water followed by 25% activator) at about 2% (v/w) based on total treatment fluid volume. This sample was then placed in a T-test as described as follows. The evaluation of a liquid or solution of a compound for use as a tackifying compound may be accomplished by the following test: First, a critical resuspension velocity is determined for the material upon which the tackifying compound is to be coated. One suitable test apparatus comprises a ½" glass tee that is connected to an inlet source of water and an outlet disposal line is blocked to fluid flow. A water-based slurry of particulates is aspirated into the tee through inlet and collected within portion by filtration against a screen. When portion of tee is full, the vacuum source is removed and a plug is used to seal the end of portion. The flow channel from inlet to outlet then is swabbed clean and a volumetrically controlled pump is connected to inlet and a controlled flow of water is initiated. The velocity of the fluid is slowly increased through inlet until the first particle of particulate material is picked up by the flowing water stream. This determines the baseline for the starting of the resuspension velocity. Next, the flow rate then is further increased until the removal of particles becomes continuous. This determines the baseline for the continuous resuspension velocity. Next, the test may then be terminated and the apparatus is refilled with particulate having a coating corresponding to about 0.5 percent active material by weight of the particulate applied thereto. Similar trends generally are seen in the results when the concentrations tested are from about 0.1 to about 3 percent, however, the 0.5 percent level which is within the preferred application range is preferred for standardization of the procedure. The test may be repeated to determine the starting point of particulate removal and the velocity at which removal becomes continuous. The percent of velocity increase (or decrease) then is determined based upon the initial or continuous baseline value.

Effectively treated proppant will resist transport as compared to untreated proppant. The test sample did not show signs of movement even when the test apparatus flowed at its maximum rate of 2,000 mL/min. Untreated 20/40 Brady Sand started flowing at 154 mL/min; the treated sand resisted flowing at fluid rates over 13-times faster than untreated.

EXAMPLE 2

Brazos River sand with particle size smaller than 100-mesh was used to simulate formation sand. This material was packed inside a 5-inch long, 1-inch ID tapered Teflon sleeve. An approximately 0.5 inch thick layer of 20/40 mesh Ottawa sand was packed below and above the Brazos River sand material. The sand column was then saturated with 3% KCl brine and flushed with this brine at 5 mL/min to determine the initial permeability of the sand pack. The column containing Brazos River sand was then treated with 2 pore volumes of a treatment fluid. The treatment fluid contained 4% by volume of a 40% solution of polyacrylate ester polymer, 0.5% activator (an acetic acid/acetic anhydride blend), 0.1% 19N Surfactant (a cationic surfactant available from Halliburton Energy Services, Duncan Okla.), 0.1% HY-CLEAN (HC-2) Surfactant (an amphoteric surfactant available from Halliburton Energy Services, Duncan Okla.), balance water. Five pore volumes of 3% KCl brine were then used to after-flush the sand pack. The treated sand column was then placed in the oven for curing at 175° F. for 20 hours.

After the curing period, flow from an opposite direction using 3% KCl brine was established through the treated sand column. Flow rate was held constant at 5 mL/min to determine the retained permeability of the sand pack as compared to that of the initial permeability. More than 95% of the permeability of the treated sand pack was retained and there was no sign of produced fines in the effluent collected during the 5 mL/min flow of KCl used to establish regained permeability. The results from this example confirm that the treatment fluid was able to stabilize the formation sand material without causing excessive damage to the permeability of the sand pack.

EXAMPLE 3

Similar preparation and test procedure as described in Example 2 were repeated in this example, except that different concentrations of the treatment fluid were used. Brazos River sand was used to simulate formation fines. This material was packed inside a 5-inch long, 1-inch ID tapered Teflon sleeve. An approximately 0.5 inch thick layer of 20/40 mesh Ottawa sand was packed below and above the Brazos River sand material. The sand column was then saturated with 3% KCl brine and flushed with this brine at 5 mL/min to determine the initial permeability of the sand pack. The column containing Brazos River sand was then treated with 2 pore volumes of a treatment fluid. The treatment fluid contained 2% by volume of a 40% solution of polyacrylate ester polymer, 0.5% activator (an acetic acid/acetic anhydride blend), 0.1% 19N Surfactant (a cationic surfactant available from Halliburton Energy Services, Duncan Okla.), 0.1% HY-CLEAN (HC-2) Surfactant (an amphoteric surfactant available from Halliburton Energy Services, Duncan Okla.), balance water. Five pore volumes of 3% KCl brine were then used to after-flush the sand pack. The treated sand column was then placed in the oven for curing at 175° F. for 20 hours.

After the curing period, flow from an opposite direction using 3% KCl brine was established through the treated sand column. Flow rate was held constant at 5 mL/min to determine the retained permeability of the sand pack as compared to that of the initial permeability. More than 97% of the permeability of the treated sand pack was retained. Again, there was no sign of fines produced in the effluents that were collected during the flow of regained permeability. The results from this example confirm that the treatment fluid was able to stabilize the formation sand material without causing excessive damage to the permeability of the sand pack.

EXAMPLE 4

Brazos river sand 70/325-mesh was used as simulated formation sand. The material was packed into two 1.5-inch ID brass cells and sandwiched between sand packs of 70/170-mesh sand. The sand column was flushed with 3 pore volumes of 3% KCl brine, followed by 2 pore volumes of a treatment fluid. The treatment fluid contained 5% by volume of a 40% solution of polyacrylate ester polymer, 0.5% activator (an acetic acid/acetic anhydride blend), 0.1% 19N Surfactant (a cationic surfactant available from Halliburton Energy Services, Duncan Okla.), 0.1% HY-CLEAN (HC-2) Surfactant (an amphoteric surfactant available from Halliburton Energy Services, Duncan Okla.), balance water.

One treated column was then placed in oven at 175° F. for 20 hours and one was placed in oven at 325° F. for 20 hours to simulate down hole curing of the well. After curing period, the treated sand was removed from the cell and observed for texture, shape, and flexibility. The treated Brazos River sand appeared as a firm structure which took the shape of the cell. Upon physical and visual inspection the sand was determined to have negligible consolidation strength as commonly observed with consolidated rock, the treated Brazos River sand grains stick together to form a stable structure.

EXAMPLE 5

Brazos river sand 70/325-mesh was used as simulated formation sand. The material was packed into two 1.5-inch ID brass cells and sandwiched between sand packs of 70/170-mesh sand. The sand column was flushed with 3 pore volumes of 3% KCl brine, followed by 2 pore volumes of a treatment fluid. The treatment fluid contained 5% by volume of a 40% solution of polyacrylate ester polymer, 0.5% activator (an acetic acid/acetic anhydride blend), 0.1% 19N Surfactant (a cationic surfactant available from Halliburton Energy Services, Duncan Okla.), 0.1% HY-CLEAN (HC-2) Surfactant (an amphoteric surfactant available from Halliburton Energy Services, Duncan Okla.), balance water.

One treated column was then placed in oven at 175° F. for 20 hours and one was placed in oven at 325° F. for 20 hours to simulate down hole curing of the well. After curing period, the treated sand was removed from the cell and observed for texture, shape, and flexibility. The treated Brazos River sand appeared as a firm structure which took the shape of the cell. Upon physical and visual inspection the sand was determined to have negligible consolidation strength as commonly observed with consolidated rock, the treated Brazos River sand grains stick together to form a stable structure.

EXAMPLE 6

Fines of Brazos River sand with sieve size of 200-mesh and smaller were used to simulate formation fines. The material was packed inside a 1-inch ID transparent acrylic flow cell for ease of observation. Ottawa sand with mesh size of 20/40 mesh was pack below and above this formation fines material. The sand column was then saturated with 3% KCl brine and flushed with this brine for 5 pore volumes, followed by 2 pore volumes of a treatment fluid. The treatment fluid contained 2% by volume of a 40% solution of polyacrylate ester polymer, 0.5% activator (an acetic acid/acetic anhydride blend), 0.1% 19N Surfactant (a cationic surfactant available from Halliburton Energy Services, Duncan Okla.), 0.1% HY-CLEAN (HC-2) Surfactant (an amphoteric surfactant available from Halliburton Energy Services, Duncan Okla.), balance water.

The treated sand column was then placed in the oven for curing at 140° F. for 20 hours. After the curing period, a flow of 3% KCl brine was established through the treated sand column with an opposite direction than the treatment fluid was established through the sand column. Flow rate was started at 10 mL/min and incrementally increased to 80 mL/min. Effluents were collected to help confirm what had been visually observed in the cell during the flow. The results all indicated that the treated column was able to substantially completely control fines migration through out all the flow rates as compared to the control.

For comparison, identical sand column prepared, but without any concentration treatment fluid added. It was observed that as soon as a flow of 3% KCl brine was established through the treated sand column, fines particulate immediately began to migrate into the sand pack and produced out as part of the effluent, even at a flow rate as low as 10 mL/min.

EXAMPLE 7

One method of determining whether a polymer is suitable for use as an aqueous tackifier: Prepare mixture consisting of 50% Acetic Anhydride and 50% Glacial Acetic acid (v/v). Place 10 ml of test polymer into 60 ml glass bottle. Next, add 40 ml of deionized water and hand swirl to mix. Then, add 15 ml of acetic acid/acetic anhydride (or other activator). Shake bottle vigorously for 30 seconds. A suitable polymer will form a solid or semi-solid mass. Repeat screen with other known activators such as acetic acid/acetic anhydride blend, other acids, acids salts, anhydrides, charged polymers, charged surfactants, sodium chloride, potassium chloride, calcium chloride and mixtures thereof.

EXAMPLE 8

Treatments were performed on a coal bed methane field exhibiting relatively low individual well production. Well production was suspected to be at least partially impaired by coal fines blocking inflow of gas to the well bore. The wells had been previously hydraulically fractured in multiple coal seams. Two wells were treated with solution comprising acetic anhydride, glacial acetic acid, a polyacrylate ester polymer aqueous tackifier compound, enzyme, and oxidizer in water.

The first well went from a methane production of about 43 MCFD (thousand cubic feet per day) before treatment to about 75 MCFD after treatment. Similarly, the second well went from a methane production of about 80 MCFD before treatment to about 105 MCFD after treatment. Moreover, observations from these treated wells show the produced water to be free of fine particulates as compared to their pre-treatment state; thus supporting the hypothesis that effective stabilization of the formation particles was achieved.

EXAMPLE 9

A 50 ml slurry of ground coal particles (Subitmunious A) was prepared from dry coal ground with a mortar and pestle and placed into a bottle containing fresh water and slurried. The coal/water slurry was then treated with 10 ml of a solution comprising acetic anhydride, glacial acetic acid, water, and a polyacrylate ester polymer aqueous tackifier compound. Following treatment, initial flocculation of the coal particles was observed over about a period of 12 hours, after which the coal particles were observed as an agglomerated mass that was capable of breaking and re-forming upon agitation. The water phase was clarified with no visible fine particles remaining in solution. This example illustrated visually the described process of coal fines stabilization and removal from aqueous solution.

EXAMPLE 10

A solid sample of coal approximately 2 cm square was placed in a 60 ml bottle containing water. The bottle was then placed in an ultra-sonicator for 10 minutes. The result was a visible amount of coal particles that spalled from the surface of the larger chunk. In another bottle, a substantially identical sample of coal was treated with a solution comprising acetic anhydride, glacial acetic acid, water, and a polyacrylate ester polymer aqueous tackifier compound and then placed in water and then placed in an ultra-sonicator for 10 minutes. Visual observation of the treated coal sample showed a nearly complete lack of coal fines spalling from the surface of the coal that has been treated.

EXAMPLE 11

A treatment was performed on a weakly consolidated gas producing clastic formation exhibiting low well production. Well production was suspected to be at least partially impaired by fines blocking inflow of gas to the well bore. The wells had been previously hydraulically fractured. The well was treated with an aqueous tackifier compound comprising a polyacrylate ester, acetic anhydride/acetic acid, quaternary ammonium surfactant, amphoteric surfactant, enzyme, and oxidizer in water. The well's production went from 30 MCFD to 200 MCFD, showing that the fines problem had been substantially remediated.

EXAMPLE 12

A 1 gram sample of activated coal fines was treated (2% cationic polyacrylamide polymer concentrate, 1% AQF-2 Surfactant (an anionic surfactant available from Halliburton Energy Services, Duncan Okla.), 93% water followed by 4% acetic anhydride/acetic acid activator) with 100 ml of cationic tackifying fluid. The fines were consolidated into a tacky mass within 5 minutes.

EXAMPLE 13

A 1 gram sample of activated coal fines was treated (2% cationic polyacrylamide polymer concentrate, 1% AQF-2 Surfactant (an anionic surfactant available from Halliburton Energy Services, Duncan Okla.), 1% HY-CLEAN (HC-2) Surfactant (an amphoteric surfactant available from Halliburton Energy Services, Duncan Okla.), 92% water followed by 4% acetic anhydride/acetic acid activator) with 100 ml of cationic tackifying fluid. The fines were consolidated into a tacky mass within 5 minutes.

EXAMPLE 14

Fines of Brazos River sand with sieve size of 200-mesh and smaller were used to simulate formation fines. Seven grams of this formation fines material was mixed with 10 grams of 20/40-mesh Ottawa sand. The mixture was packed inside a 1-inch ID transparent acrylic flow cell for ease of observation. Ottawa sand with mesh size of 40/60 mesh was packed below and 12/20-mesh Brady sand was packed above this formation fines material. The sand column was then saturated with 3% KCl brine and then flushed with 4 pore volumes of a treatment fluid. The treatment fluid contained 1% by volume of a 40% solution of polyacrylate ester polymer, 5% activator (acetic anhydride/acetic acid blend), 0.2% 19N Surfactant (cationic surfactant available from Halliburton Energy Services, Duncan Okla.), 0.1% HY-CLEAN (HC-2) Surfactant (amphoteric surfactant available from Halliburton Energy Services, Duncan Okla.), and balance water). The treated sand column was then placed in the oven for curing at 175° F. for 2 hours. After the curing period, flow using 3% KCl brine was established through the treated sand column in opposite direction from that during treatment. Flow rate was started at 20 mL/min and incrementally increased to 100 mL/min. Effluents were collected for total suspended solid analysis to help determine if fines was effectively controlled by the aqueous tackifying compound treatment.

To help determine the impact of cure time at temperature, similar tests were performed; however, the cure time was increased to 4 hours and 16 hours (Table 1). For comparison purpose with a control sample, an identical sand column was prepared, but treatment fluid was not applied and no curing step occurred. It was observed that in the control sand pack, as soon as the flow was established, fines particulate immediately began to migrate into the sand pack and produced out as part of the effluent. Effluents were collected for total suspended solid analysis (Table 1).

The results all indicated that the aqueous tackifying compound treatment was able to control fines migration at cure time longer than 2 hours and all treated columns showed significant improvement in fines control in comparing to that of the control (i.e. untreated column) (Table 1).

TABLE 1

| Flow Rate | Total Suspended Solid (mg/L) | | | |
|---|---|---|---|---|
| (mL/min) | Control | 2-hr Curing | 4-hr Curing | 16-hr Curing |
| 20 | 69.4 | 38.1 | 85.6 | 3.1 |
| 40 | 139.4 | 20.8 | 10.2 | 14.1 |
| 80 | 1320 | 245.9 | 78.4 | 61.6 |
| 100 | 868.2 | 114.4 | 39.0 | 35.7 |

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of treating a portion of a subterranean formation in preparation for a fracturing operation comprising:
    placing a pre-pad fluid into a portion of a subterranean formation comprising unconsolidated particulates wherein the pre-pad fluid comprises a low-viscosity aqueous tackifying composition that itself comprises an aqueous tackifier compound and an aqueous fluid;
    placing a fracturing fluid into the portion of the subterranean formation at a pressure sufficient to create or extend at least one fracture therein; and,
    activating the aqueous tackifler compound with an activator so as to consolidate the unconsolidated particulates within the portion of the subterranean formation.

2. The method of claim 1 wherein the low-viscosity aqueous tackifying composition is a foamed fluid comprising an aqueous tackifier compound, an aqueous fluid, and a foaming agent.

3. The method of claim 2 wherein the foaming agent comprises a gas selected from the group consisting of: nitrogen or carbon dioxide.

4. The method of claim 2 wherein the low-viscosity aqueous tackifying composition further comprises a surfactant.

5. The method of claim 4 wherein the surfactant includes a surfactant chosen from the group consisting of: ethoxylated nonyl phenol phosphate ester, a cationic surfactant, a non-ionic surfactant, and alkyl phosphonate surfactant.

6. The method of claim 4 wherein the surfactant is present in the low-viscosity aqueous tackifying composition in an amount ranging from about 0.1% to about 15% by weight of the aqueous fluid.

7. The method of claim 1 wherein the low-viscosity aqueous tackifying composition has a viscosity of less than about 100 cp.

8. The method of claim 1 wherein the low-viscosity aqueous tackifying composition has a viscosity of less than about 50 cp.

9. The method of claim 1 wherein the low-viscosity aqueous tackifying composition has a viscosity of less than about 10 cp.

10. The method of claim 1 wherein the low-viscosity aqueous tackifying composition further comprises a solvent.

11. The method of claim 10 wherein the solvent comprises a solvent selected from the group consisting of: water, butylglycidyl ether, dipropylene glycol methyl ether, butyl bottom alcohol, dipropylene glycol dimethyl ether, diethyleneglycol methyl ether, ethyleneglycol butyl ether, diethyleneglycol butyl ether, propylene carbonate, butyl lactate, dimethyl sulfoxide, dimethyl formamide, and fatty acid methyl ester.

12. The method of claim 1 further comprising the step of, before placing a low-viscosity aqueous tackifying composition, placing a preflush fluid into the portion of the subterranean formation comprising unconsolidated particulates.

13. The method of claim 12 wherein the preflush fluid comprises an aqueous fluid and a charged compound.

14. The method of claim 13 wherein the charged compound is selected from the group consisting of: an organic acid, an anhydride of an organic acid, an inorganic acid, an inorganic salt, a charged surfactant, and a charged polymer.

15. The method of claim 13 wherein the charged compound is present in the preflush fluid in an amount ranging from about 0.1% to about 15% by weight of the aqueous liquid.

16. The method of claim 1 wherein the aqueous tackifier compound is activated using an activator and wherein the activator is selected from the group consisting of: an organic acid, an anhydride of an organic acid, an inorganic acid, an inorganic salt, a charged surfactant, and a charged polymer.

17. The method of claim 1 wherein the activator comprises an acetic acid/acetic anhydride blend.

18. The method of claim 1 wherein the aqueous tackifier compound comprises a polymer selected from the group consisting of: an acrylic acid polymer, an acrylic acid ester polymer, an acrylic acid derivative polymer, an acrylic acid homopolymer, an acrylic acid ester homopolymer, an acrylic acid ester co-polymer, a methacrylic acid derivative polymer, a methacrylic acid homopolymer, a methacrylic acid ester homopolymer, an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and copolymers or combinations thereof.

19. The method of claim 1 wherein the aqueous tackifier compound is activated before the step of placing a fracturing fluid into the portion of the subterranean formation.

20. The method of claim 19 wherein, before the step of placing a fracturing fluid into the portion of the subterranean formation and after the step of activating the aqueous tackifier compound, the following step is performed: placing an afterflush fluid into the portion of the subterranean formation.

21. The method of claim 20 wherein the afterflush fluid includes an aqueous liquid or a combination of an aqueous liquid and a surfactant.

22. The method of claim 21 wherein the surfactant in the afterflush fluid is at least one of: an ethoxylated nonyl phenol phosphate ester, a cationic surfactant, a non-ionic surfactant, and an alkyl phosphonate surfactant.

23. The method of claim 21 wherein the surfactant is present in the afterflush fluid in an amount ranging from about 0.1% to about 15% by weight of the aqueous liquid.

24. A method of consolidating unconsolidated particulates within a portion of a subterranean formation comprising:
placing a foamed low-viscosity aqueous tackifying composition into a portion of a subterranean formation comprising unconsolidated particulates wherein the aqueous tackifying composition comprises an aqueous fluid, a foaming agent, and an aqueous tackifier compound; and,
activating the aqueous tackifier compound with an activator so as to consolidate the unconsolidated particulates within the portion of the subterranean formation.

25. The method of claim 24 wherein the foaming agent comprises a gas selected from the group consisting of: nitrogen and carbon dioxide.

26. The method of claim 24 wherein the low-viscosity aqueous tackifying composition further comprises a surfactant.

27. The method of claim 26 wherein the surfactant comprises a surfactant chosen from the group consisting of: an ethoxylated nonyl phenol phosphate ester, a cationic surfactant, a non-ionic surfactant, and an alkyl phosphonate surfactant.

28. The method of claim 26 wherein the surfactant is present in the low-viscosity aqueous tackifying composition in an amount ranging from about 0.1% to about 15% by weight of the aqueous fluid.

29. The method of claim 24 wherein the low-viscosity aqueous tackifying composition has a viscosity of less than about 100 cp.

30. The method of claim 24 wherein the low-viscosity aqueous tackifying composition has a viscosity of less than about 50 cp.

31. The method of claim 24 wherein the low-viscosity aqueous tackifying composition has a viscosity of less than about 10 cp.

32. The method of claim 24 wherein the low-viscosity aqueous tackifying composition further comprises a solvent.

33. The method of claim 32 wherein the solvent comprises a solvent selected from the group consisting of: water, butylglycidyl ether, dipropylene glycol methyl ether, butyl bottom alcohol, dipropylene glycol dimethyl ether, diethyleneglycol methyl ether, ethyleneglycol butyl ether, diethyleneglycol butyl ether, propylene carbonate, butyl lactate, dimethyl sulfoxide, dimethyl formamide, and fatty acid methyl ester.

34. The method of claim 24 further comprising the step of, before placing a low-viscosity aqueous tackifying composition, placing a preflush fluid into the portion of the subterranean formation comprising unconsolidated particulates.

35. The method of claim 34 wherein the preflush fluid comprises an aqueous fluid and a charged compound.

36. The method of claim 35 wherein the charged compound is selected from the group consisting of: an organic acid, an anhydride of an organic acid, an inorganic acid, an inorganic salt, a charged surfactant, and a charged polymer.

37. The method of claim 35 wherein the charged compound is present in the preflush fluid in an amount ranging from about 0.1% to about 15% by weight of the aqueous fluid.

38. The method of claim 24 wherein the activator is selected from the group consisting of: an organic acid, an anhydride of an organic acid, an inorganic acid, an inorganic salt, a charged surfactant, and a charged polymer.

39. The method of claim 24 wherein the activator comprises an acetic acid/acetic anhydride blend.

40. The method of claim 24 wherein the aqueous tackifier compound comprises a polymer selected from the group consisting of: an acrylic acid polymer, an acrylic acid ester polymer, an acrylic acid derivative polymer, an acrylic acid homopolymer, an acrylic acid ester homopolymer, an acrylic acid ester co-polymer, a methacrylic acid derivative polymer, a methacrylic acid homopolymer, a methacrylic acid ester homopolymer, an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and copolymers or combinations thereof.

41. The method of claim 24 further comprising the step of, after activating the aqueous tackifier compound, placing an afterflush fluid into the portion of the subterranean formation.

42. The method of claim 41 wherein the afterflush fluid includes an aqueous liquid or a combination of an aqueous liquid and/or a surfactant.

43. The method of claim 42 wherein the surfactant in the afterflush fluid is chosen from the group consisting of: an ethoxylated nonyl phenol phosphate ester, a cationic surfactant, a non-ionic surfactant, and an alkyl phosphonate surfactant.

44. The method of claim 42 wherein the surfactant is present in the afterflush fluid in an amount ranging from about 0.1% to about 15% by weight of the aqueous liquid.

* * * * *